US008911989B2

(12) United States Patent
Lee et al.

(10) Patent No.: US 8,911,989 B2
(45) Date of Patent: Dec. 16, 2014

(54) MICROFLUIDIC BIOCHIP

(75) Inventors: Gwo-Bin Lee, Tainan (TW); Sung-Yi Yang, Taichung County (TW); Song-Bin Huang, Taoyuan County (TW); Kang-Yi Lien, Kaohsiung County (TW); Chen-Hsun Weng, Kaohsiung County (TW)

(73) Assignee: National Cheng Kung University, Tainan (TW)

( * ) Notice: Subject to any disclaimer, the term of this patent is extended or adjusted under 35 U.S.C. 154(b) by 857 days.

(21) Appl. No.: 12/795,445

(22) Filed: Jun. 7, 2010

(65) Prior Publication Data

US 2011/0136179 A1   Jun. 9, 2011

(30) Foreign Application Priority Data

Oct. 30, 2009  (TW) ................................ 98136932 A

(51) Int. Cl.
| C12M 1/00 | (2006.01) |
| C12P 19/34 | (2006.01) |
| B01L 3/00 | (2006.01) |
| B01F 11/00 | (2006.01) |
| B01F 13/00 | (2006.01) |
| F16K 99/00 | (2006.01) |
| B01L 7/00 | (2006.01) |

(52) U.S. Cl.
CPC ..... *F16K 99/0001* (2013.01); *F16K 2099/0084* (2013.01); *B01L 2400/043* (2013.01); *B01L 3/502738* (2013.01); *B01L 2300/0867* (2013.01); *B01F 11/0071* (2013.01); *F16K 99/0059* (2013.01); *B01L 2300/0819* (2013.01); *B01F 13/0059* (2013.01); *B01L 2400/049* (2013.01); *B01L 3/50273* (2013.01); *F16K 2099/008* (2013.01); *F16K 99/0015* (2013.01); *B01L 7/52* (2013.01)
USPC ...................................... 435/303.1; 435/91.2

(58) Field of Classification Search
None
See application file for complete search history.

(56) References Cited

PUBLICATIONS

Liu et al. (2004) Anal. Chem. vol. 76: pp. 1824-1831.*
Yu et al. (2003) Sensors and Actuators A vol. 108 pp. 103-107.*
Prakash et al. (2006) Sensors and Actuators B 113: pp. 398-409.*
Eddings et al. (2006) J. Micromech. Microeng. vol. 16: pp. 2396-2402.*
Baek et al. J. Micromech. Microeng. (2005) vol. 15 No. 1015-1020.*
Trung et al. (on line publication Jun. 19, 2010) Sensors and Actuators B 149: 284-290.*

* cited by examiner

*Primary Examiner* — Suchira Pande
(74) *Attorney, Agent, or Firm* — Birch, Stewart, Kolasch & Birch, LLP

(57) ABSTRACT

The present invention provides a microfluidic biochip, which comprises: a fluid transportation unit having a fluid transportation reservoir and a fluid transportation air chamber; a first fluid storage reservoir; a second fluid storage reservoir; a first valve unit having a first valve and a first valve control air chamber; and a second valve unit having a second valve and a second valve control air chamber; wherein the first valve unit is located between the first fluid storage reservoir and the fluid transportation unit, the second valve unit is located between the second fluid storage reservoir and the fluid transportation unit, and the top portion of the fluid transportation reservoir and the valves are made of a flexible material. The structure of the present microfluidic biochip allows fluids to be transported and/or mixed therein.

13 Claims, 12 Drawing Sheets

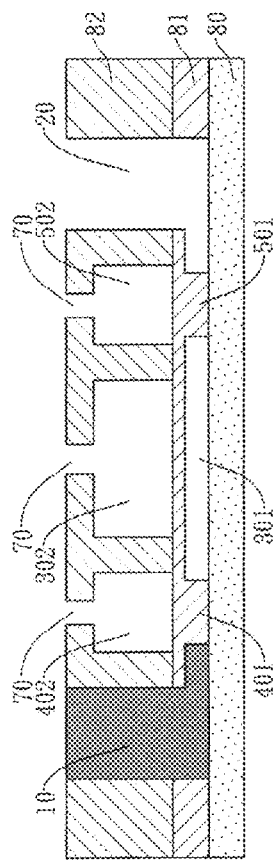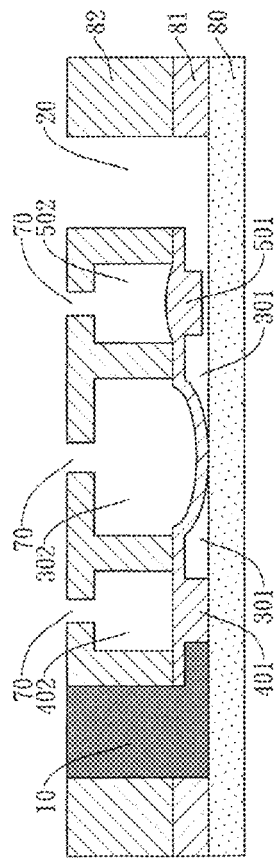
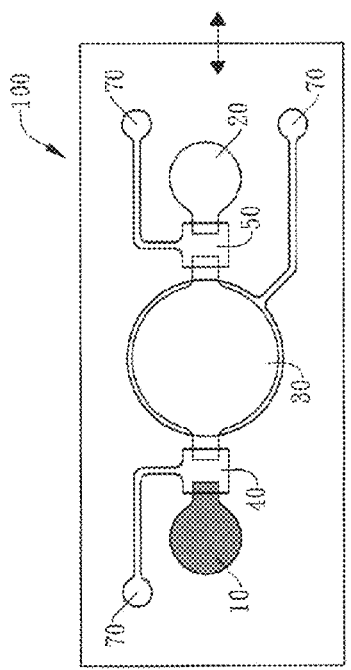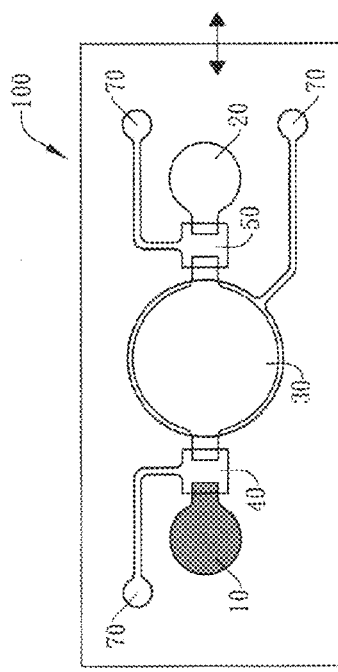
Fig. 4(a)　　　　　Fig. 4(b)

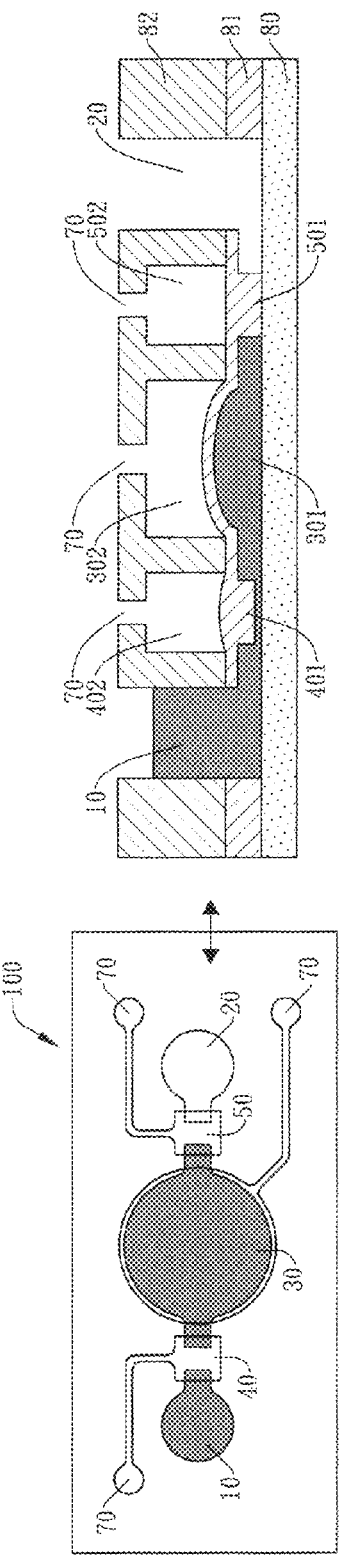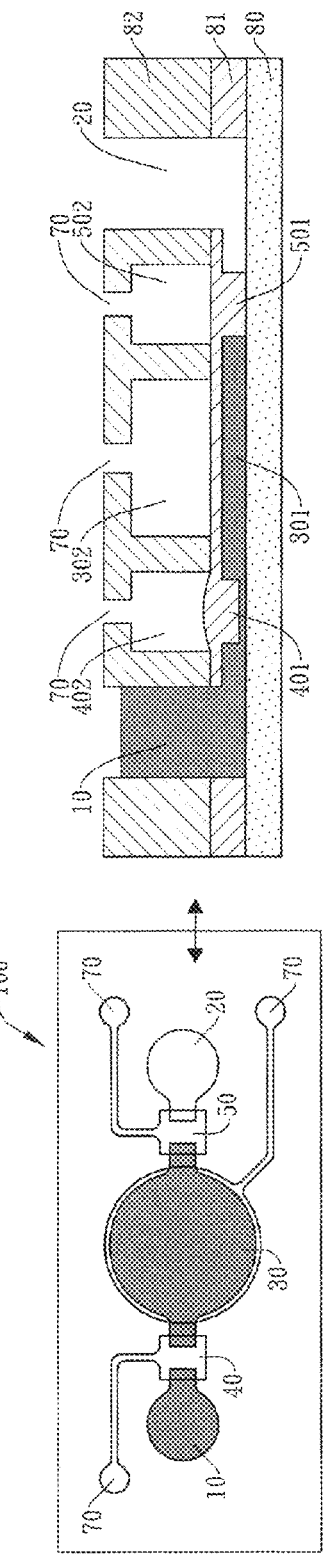
Fig. 4(c)
Fig. 4(d)

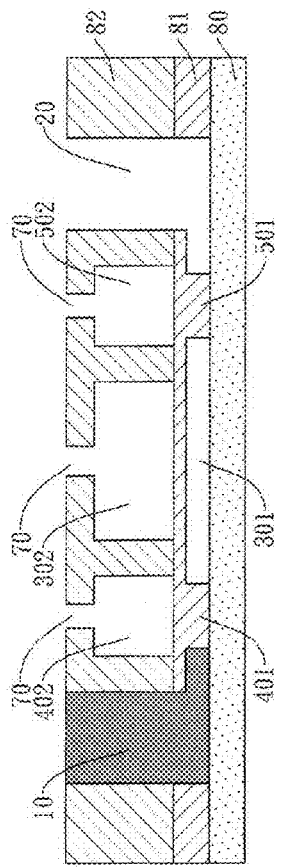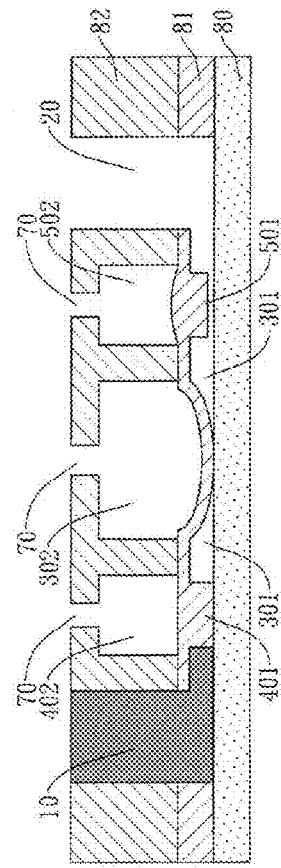
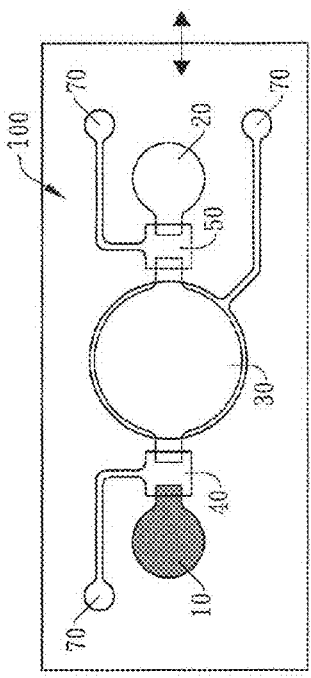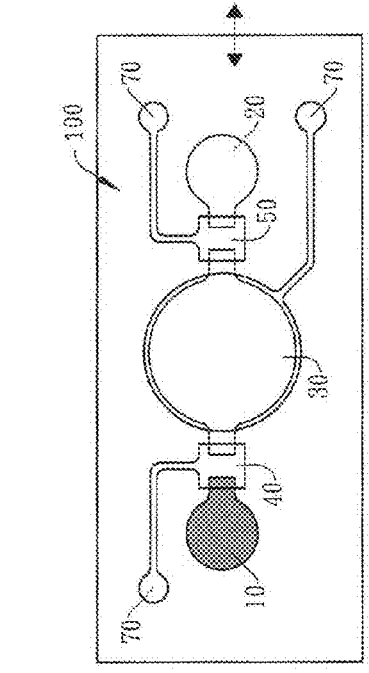
Fig. 5(a)
Fig. 5(b)

(a)

(b)

(c)

MICROFLUIDIC BIOCHIP

BACKGROUND OF THE INVENTION

1. Field of the Invention

The present invention relates to a microfluidic biochip and a method of using the same; more particularly, the present invention relates to a PCR (polymerase chain reaction) biochip and a method of using the same.

2. Description of the Related Art

Fluid mixing and transportation are essential procedures in the research field of biochemistry. Thus, to develop devices that are simple in design yet can achieve effective fluid mixing and transportation within a short time has been an important issue for biochip researchers. Most of the conventional fluid mixing or transportation devices use passive methods to mix or transport substances. For example, in such a conventional device, gravity may be used to make more than two fluids flow inside the device; then, the fluids are mixed or transported through the use of a blocking or bending structure of the device. However, when this kind of fluid mixing or transportation technique is applied, the mixing or transportation performance is generally poor; moreover, it consumes much more time for fluids to be completely mixed or transported, which tends to denature fluid samples more easily. Thus, the conventional technique is not favorable for applications in the biochemical research field.

In recent years, more and more researches in the biology, chemical and medical fields are focusing on micrometer- and nanometer-scale substances. However, conventional fluid mixing and transportation devices are generally of great volume and tend to use large-sized containers or mixers during the operation process. To achieve better mixing or transportation performances using such large-sized devices, a great amount of substances are required and consumed; furthermore, much more time is required, and the product after mixture or transportation may have a problem of uneven temperature distribution. It is thus worthwhile to develop a microfluidic biochip that can rapidly mix or transport micrometer- and nanometer-scale substances.

SUMMARY OF THE INVENTION

In view of the drawbacks of those prior art devices, it is an objective of the present invention to provide a microfluidic biochip and a method of using the same. In a microfluidic biochip of the present invention, by changing the pressure state of predetermined air chambers contained in the biochip, the top portion of a reservoir and a valve are able to deform, so that fluids in the biochip can flow in predetermined directions to be mixed and/or transported.

It is another objective of the present invention to provide a PCR (polymerase chain reaction) biochip and a method of using the same. A PCR biochip of the present invention can be used to extract or amplify nucleic acids from a sample, and the operation process is nearly the same as that of the above microfluidic biochip; meanwhile, the consumptions of the amount of the sample and the reaction time are reduced because the extracting and amplifying processes are operated at the same reservoir of the biochip.

To achieve the above objectives, the present invention provides a microfluidic biochip, which comprises: a fluid transportation unit having a fluid transportation reservoir and a fluid transportation air chamber; a first fluid storage reservoir; a second fluid storage reservoir; a first valve unit having a first valve and a first valve control air chamber; and a second valve unit having a second valve and a second valve control air chamber; wherein the first valve unit is located between the first fluid storage reservoir and the fluid transportation unit, the second valve unit is located between the second fluid storage reservoir and the fluid transportation unit, and the top portion of the fluid transportation reservoir and the valves are made of a flexible material.

Preferably, the microfluidic biochip is a three-layer structure comprising: a substrate; a fluidic channel layer located above the substrate; and an air chamber layer located above the fluidic channel layer; wherein the fluidic channel layer is made of a flexible material.

Preferably, the fluid transportation reservoir is formed by the combination of the substrate and the fluidic channel layer.

Preferably, the fluid transportation air chamber is formed by the combination of the fluidic channel layer and the air chamber layer.

Preferably, the first fluid storage reservoir and the second fluid storage reservoir are formed by the combination of the substrate, the fluidic channel layer and the air chamber layer.

Preferably, the first valve and the second valve are located in the fluidic channel layer.

Preferably, the first valve control air chamber and the second valve control air chamber are formed by the combination of the fluidic channel layer and the air chamber layer.

The present invention further provides a method of using the above microfluidic biochip for mixing fluids, comprising the steps of: (a) loading a fluid into the first fluid storage reservoir; (b) forming a negative pressure state inside the fluid transportation reservoir to induce a downward deformation of its top portion; (c) forming a negative pressure state inside the first valve control air chamber to induce an upward deformation of the first valve, and concurrently forming a negative pressure state inside the fluid transportation air chamber to induce an upward deformation of the top portion of the fluid transportation reservoir, so that the fluid is forced to flow from the first fluid storage reservoir to the fluid transportation reservoir; (d) releasing the negative pressure inside the fluid transportation air chamber, so that the top portion of the fluid transportation reservoir recovers its original position and that the fluid is forced to flow from the fluid transportation reservoir to the first fluid storage reservoir; and (e) repeating the steps (c) to (d), so that the fluid is forced to flow back and forth between the first fluid storage reservoir and the fluid transportation reservoir to be mixed.

The present invention also provides a method of using the above microfluidic biochip for transporting fluids, comprising the steps of: (a) loading a fluid into the first fluid storage reservoir; (b) forming a negative pressure state inside the fluid transportation reservoir to induce a downward deformation of its top portion; (c) forming a negative pressure state inside the fluid transportation air chamber to induce an upward deformation of the top portion of the fluid transportation reservoir and concurrently forming a negative pressure state inside the first valve control air chamber to induce an upward deformation of the first valve, so that the fluid is forced to flow from the first fluid storage reservoir to the fluid transportation reservoir; (d) releasing the negative pressure inside the first valve control air chamber so that the first valve recovers its original position, and concurrently forming a negative pressure state inside the second valve control air chamber to induce an upward deformation of the second valve so that the fluid is forced to flow from the fluid transportation reservoir to the second fluid storage reservoir; (e) releasing the negative pressures inside the fluid transportation air chamber and the second valve control air chamber, so that the top portion of the fluid transportation reservoir and the second valve recover their original positions; and (f) repeating the steps (c) to (e), so that the fluid is forced to flow from the first fluid storage reservoir to the fluid transportation reservoir and the second fluid storage reservoir.

An alternate embodiment of a microfluidic biochip of the present invention comprises: a fluid transportation unit having a fluid transportation reservoir and a fluid transportation air chamber; a fluid storage reservoir; and a valve unit having a valve and a valve control air chamber; wherein the valve unit is located between the fluid storage reservoir and the fluid transportation unit, and the top portion of the fluid transportation reservoir and the valve are made of a flexible material.

Preferably, the microfluidic biochip is a three-layer structure comprising: a substrate; a fluidic channel layer located above the substrate; and an air chamber layer located above the fluidic channel layer; wherein the fluidic channel layer is made of a flexible material.

Preferably, the fluid transportation reservoir is formed by the combination of the substrate and the fluidic channel layer.

Preferably, the fluid transportation air chamber is formed by the combination of the fluidic channel layer and the air chamber layer.

Preferably, the fluid storage reservoir is formed by the combination of the substrate, the fluidic channel layer and the air chamber layer.

Preferably, the valve is located in the fluidic channel layer.

Preferably, the valve control air chamber is formed by the combination of the fluidic channel layer and the air chamber layer.

Moreover, the present invention provides a PCR (polymerase chain reaction) biochip, which comprises: a first fluid transportation unit, having a first fluid transportation reservoir and a first fluid transportation air chamber; a second fluid transportation unit, having a second fluid transportation reservoir and a second fluid transportation air chamber; a plurality of storage reservoirs; a plurality of PCR reservoirs; a plurality of storage reservoir valve units, each of which having a storage reservoir valve and a storage reservoir valve control air chamber and being located between the first fluid transportation unit and each storage reservoir; a plurality of PCR reservoir valve units, each of which having a PCR reservoir valve and a PCR reservoir valve control air chamber and being located between the second fluid transportation unit and each PCR reservoir; a connection valve unit, having a connection valve and a connection valve control air chamber and being located between the first fluid transportation unit and the second fluid transportation unit; a magnetic field generating unit for generating a magnetic field around the first fluid transportation unit; and a temperature control unit to cause temperature variations inside each PCR reservoir; wherein each valve, the top portion of the first fluid transportation reservoir and the top portion of the second fluid transportation reservoir are made of a flexible material.

Preferably, the PCR biochip is a three-layer structure comprising: a substrate; a fluidic channel layer located above the substrate; and an air chamber layer located above the fluidic channel layer; wherein the fluidic channel layer is made of a flexible material.

Preferably, the first fluid transportation reservoir and the second fluid transportation reservoir are formed by the combination of the substrate and the fluidic channel layer.

Preferably, the first fluid transportation air chamber and the second fluid transportation air chamber are formed by the combination of the fluidic channel layer and the air chamber layer.

Preferably, the plurality of storage reservoirs and the plurality of PCR reservoirs are formed by the combination of the substrate, the fluidic channel layer and the air chamber layer.

Preferably, the plurality of storage reservoir valves, the plurality of PCR reservoir valves and the connection valve are located in the fluidic channel layer.

Preferably, the plurality of storage reservoir valve control air chambers, the plurality of PCR reservoir valve control air chambers and the connection valve control air chamber are formed by the combination of the fluidic channel layer and the air chamber layer.

Preferably, the magnetic field generating unit is located below the bottom of the first fluid transportation unit, and preferably, the magnetic field generating unit is a microcoil array, a ferrite magnet, an NdFeB magnet or a combination of the above.

Preferably, the temperature control unit includes a heating device and a temperature sensor, and preferably, the temperature control unit is made of platinum, aluminum, copper, ceramic or a combination of the above.

In a microfluidic biochip or PCR biochip of the present invention, preferably, the substrate and the air chamber layer are made of a rigid or flexible material; preferably, the rigid material is glass or rigid plastic, and the flexible material is poly-diamethylsiloxane (PDMS) or food grade silica gel.

In the aforementioned microfluidic biochip or PCR biochip, preferably, each air chamber further comprises an air pore as an opening for air to be injected into or extracted from the air chamber.

In the aforementioned microfluidic biochip or PCR biochip, preferably, the negative pressure state inside the fluid transportation reservoir is formed by extracting air from both the second fluid storage reservoir and the second valve control air chamber.

In the aforementioned microfluidic biochip or PCR biochip, preferably, the negative pressure state inside the first fluid transportation reservoir is formed by subsequently extracting air from the second fluid transportation reservoir and the connection valve control air chamber, and the negative pressure state inside the second fluid transportation reservoir is formed by subsequently extracting air from the first fluid transportation reservoir and the connection valve control air chamber.

In the aforementioned microfluidic biochip or PCR biochip, preferably, the negative pressure state inside the fluid transportation reservoir is formed by extracting air from both the fluid storage reservoir and the valve control air chamber.

In the aforementioned microfluidic biochip or PCR biochip, preferably, the positive pressure state inside each air chamber formed by injecting air thereinto, and the negative pressure state inside each air chamber is formed by extracting air therefrom.

In other embodiments of a microfluidic biochip according to the present invention, the fluid transportation unit may be formed by a flexible section and a fluid transportation air chamber. That is to say, the aforementioned fluid transportation reservoir is not necessarily a fixed component in the biochip; rather, it can be a flexible section made of a flexible material. When the microfluidic biochip is not activated, said flexible section contacts the substrate.

When the microfluidic biochip is activated, a negative pressure state is formed inside the fluid transportation air chamber to induce an upward deformation of said flexible section. After such upward deformation, a cavity can be formed between the flexible section and the substrate, and the cavity will allow fluids to flow inside to be transported.

As mentioned above, a microfluidic biochip of the present invention can be employed to mix or transport fluids by changing the pressure state inside the components. Moreover, the biochip of the present invention is small in size and only consumes a small amount of a sample to achieve the fluid transportation or mixing effect. In addition, the basic construction of this microfluidic biochip allows a user to design a microfluidic biochip that suits his/her own needs. For example, the user may freely combine single or multiple sets of the fluid transportation unit, fluid storage reservoir and valve to develop a suitable microfluidic biochip. The aforementioned PCR biochip of the present invention, which is specifically designed for performing a PCR process, is developed based on such basic construction of the microfluidic biochip. When this PCR biochip is employed, it only takes a short time to complete the operation of extracting or amplifying nucleic acids from a sample, and carrying out the whole process only needs a single biochip; by reducing the reaction time in the process, the possibility of sample denaturation is also reduced.

BRIEF DESCRIPTION OF THE DRAWINGS

FIGS. 4(a) through 4(d) schematically show the steps of mixing a fluid using the microfluidic biochip of the present invention;
FIGS. 5(a) through 5(e) schematically show the steps of transporting a fluid using the microfluidic biochip of the present invention.

DETAILED DESCRIPTION OF THE PREFERRED EMBODIMENTS

Figure 1:
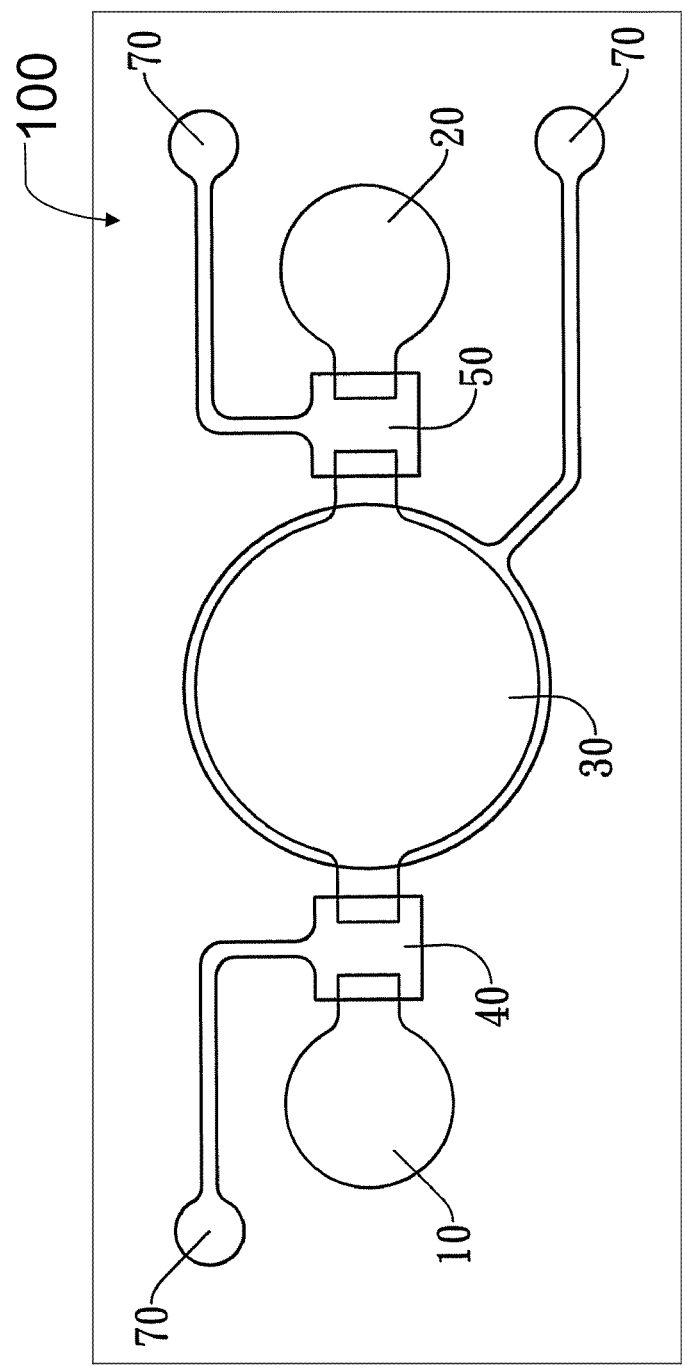
FIG. 1 is a schematic top view showing a microfluidic biochip of the present invention.
Figure 2:
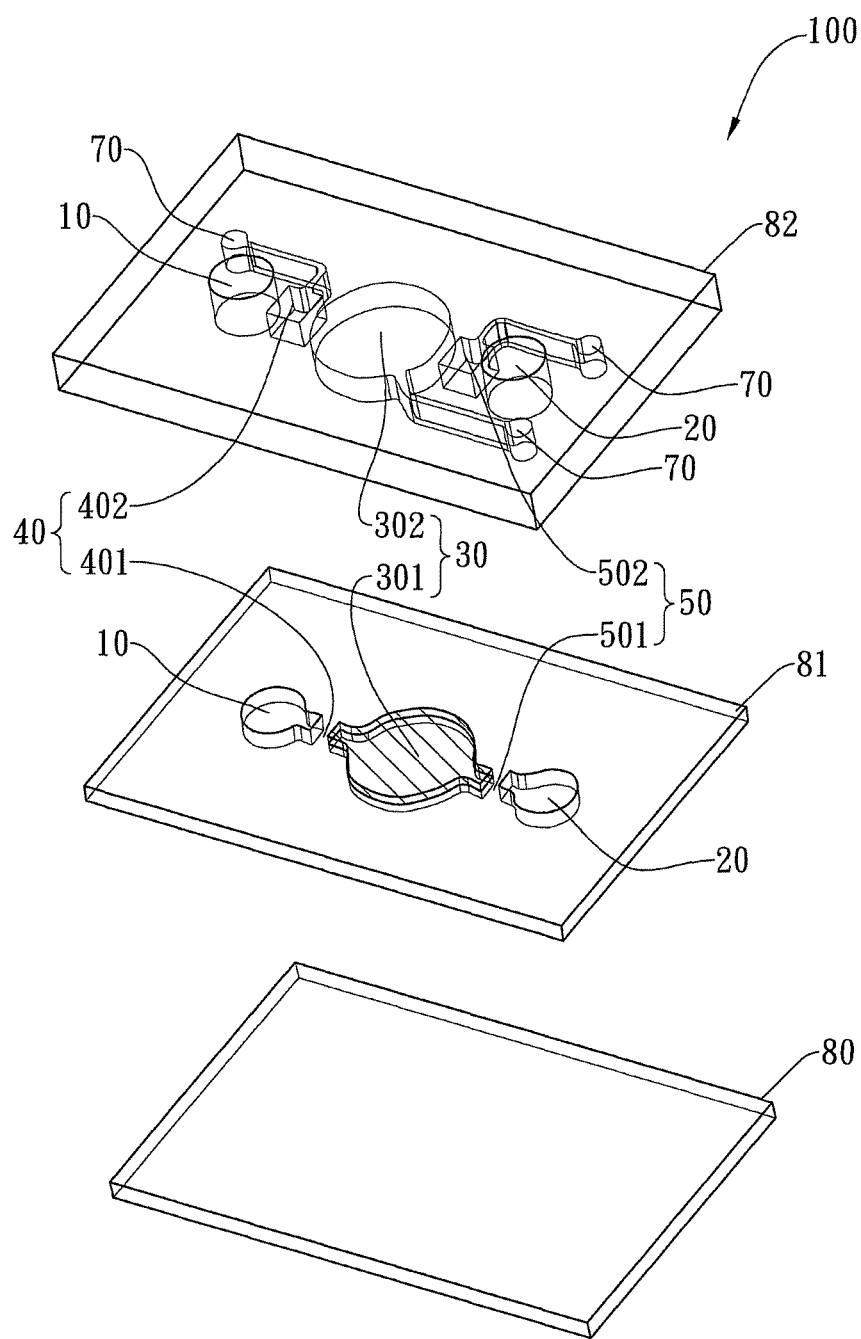
FIG. 2 schematically shows the three-layer structure of the microfluidic biochip of the present invention.

FIG. 1 and FIG. 2 show the parts of a microfluidic biochip 100 of the present invention. The microfluidic biochip 100 comprises: a fluid transportation unit 30 having a fluid transportation reservoir 301 and a fluid transportation air chamber 302; a first fluid storage reservoir 10; a second fluid storage reservoir 20; a first valve unit 40 having a first valve 401 and a first valve control air chamber 402; and a second valve unit 50 having a second valve 501 and a second valve control air chamber 502. The first valve unit 40 is located between the first fluid storage reservoir 10 and the fluid transportation unit 30; the second valve unit 50 is located between the second fluid storage reservoir 20 and the fluid transportation unit 30. The top portion of the fluid transportation reservoir 301 and the valves 401, 501 are made of a flexible material.

Figure 3:
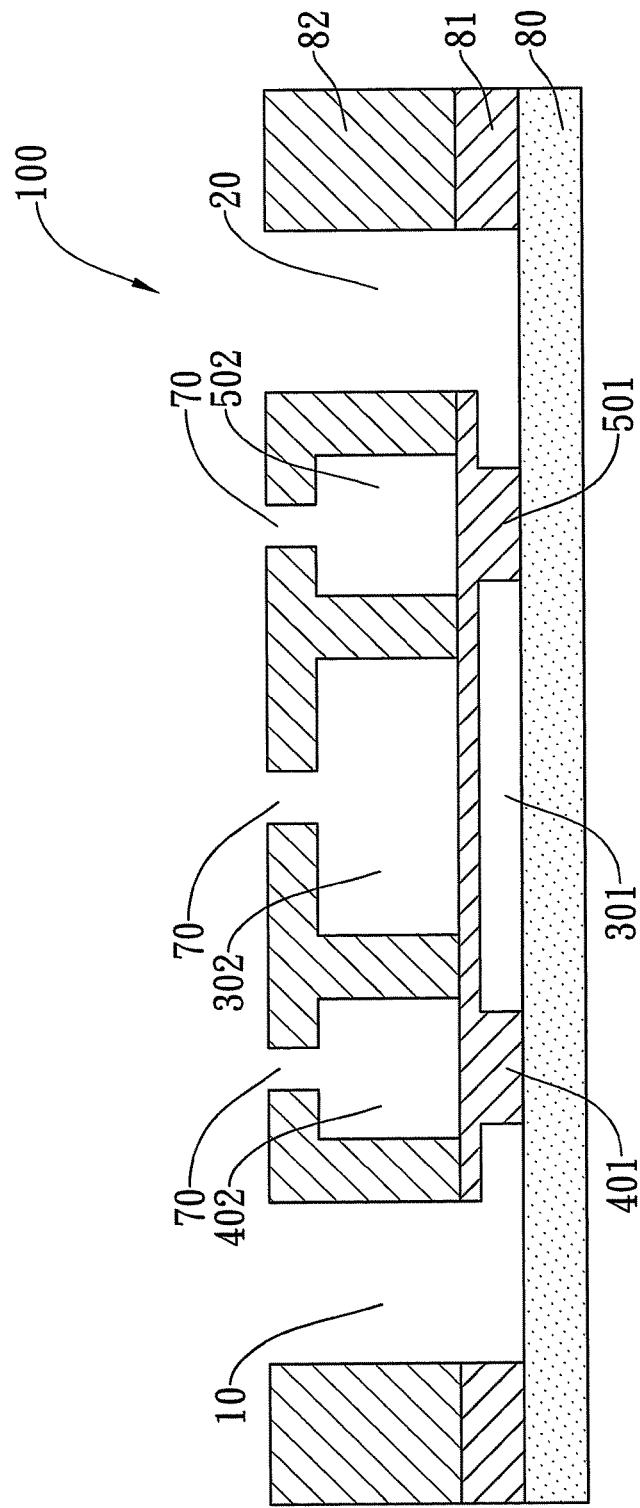
FIG. 3 is a schematic cross-sectional view showing the structure of the microfluidic biochip of the present invention.

As shown in FIGS. 2 and 3, the microfluidic biochip 100 is a three-layer structure comprising: a substrate 80; a fluidic channel layer 81 located above the substrate 80; and an air chamber layer 82 located above the fluidic channel layer 81; wherein the fluidic channel layer 81 is made of a flexible material. The fluid transportation reservoir 301 is formed by the combination of the substrate 80 and the fluidic channel layer 81; the fluid transportation air chamber 302 is formed by the combination of the fluidic channel layer 81 and the air chamber layer 82. The first fluid storage reservoir 10 and the second fluid storage reservoir 20 are formed by the combination of the substrate 80, the fluidic channel layer 81 and the air chamber layer 82. The first valve 401 and the second valve 501 are located in the fluidic channel layer 81. The first valve control air chamber 402 and the second valve control air chamber 502 are formed by the combination of the fluidic channel layer 81 and the air chamber layer 82.

The microfluidic biochip 100 can be used to mix and/or transport fluids, and the operation process is described in detail as follows.

Referring to FIGS. 4(a) through 4(d), the method of using the microfluidic biochip 100 to mix fluids includes the steps of: (a) loading a fluid into the first fluid storage reservoir 10, as shown in FIG. 4(a); (b) forming a negative pressure state (the method of forming a negative pressure state will be described in detail below) inside the fluid transportation reservoir 301 to induce a downward deformation of its top portion, as shown in FIG. 4(b); (c) forming a negative pressure state inside the first valve control air chamber 402 to induce an upward deformation of the first valve 401, and concurrently forming a negative pressure state inside the fluid transportation air chamber 302 to induce an upward deformation of the top portion of the fluid transportation reservoir 301, so that the fluid is forced to flow from the first fluid storage reservoir 10 to the fluid transportation reservoir 301 as shown in FIG. 4(c); (d) releasing the negative pressure inside the fluid transportation air chamber 302, so that the top portion of the fluid transportation reservoir 301 recovers its original position and that the fluid is forced to flow from the fluid transportation reservoir 301 to the first fluid storage reservoir 10 as shown in FIG. 4(d); and (e) repeating the steps (c) to (d), so that the fluid is forced to flow back and forth between the first fluid storage reservoir 10 and the fluid transportation reservoir 301 to be properly mixed.

In the steps (c) and (d) described above, a positive pressure state may further be formed inside the second valve control air chamber 502, so that the force which drives the second valve 501 to move downward becomes stronger. This enables the second valve 501 to more firmly block the channel between the fluid transportation reservoir 301 and the second fluid storage reservoir 20, and therefore prevents the fluid to flow from the fluid transportation reservoir 301 to the second fluid storage reservoir 20.

Figure 5C:
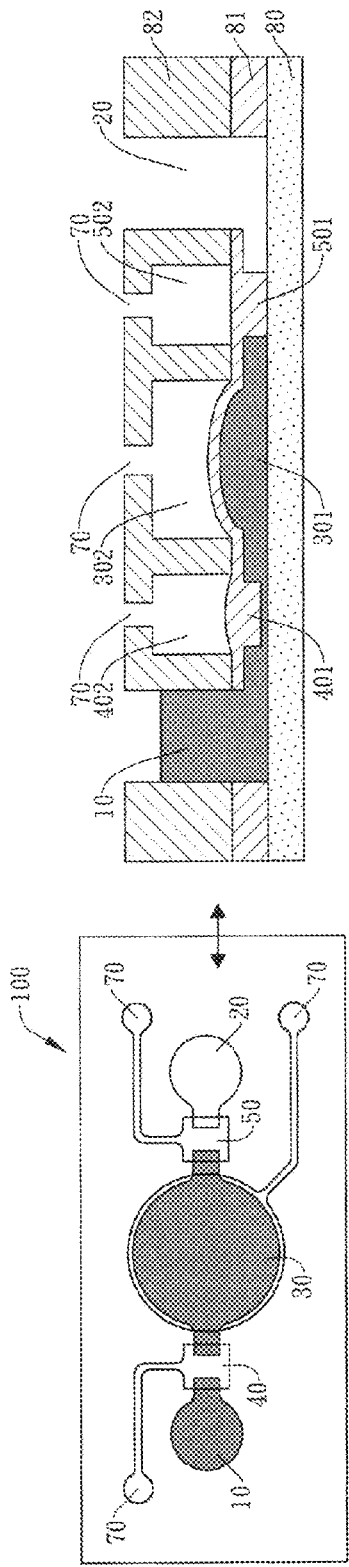
Figure 5D:
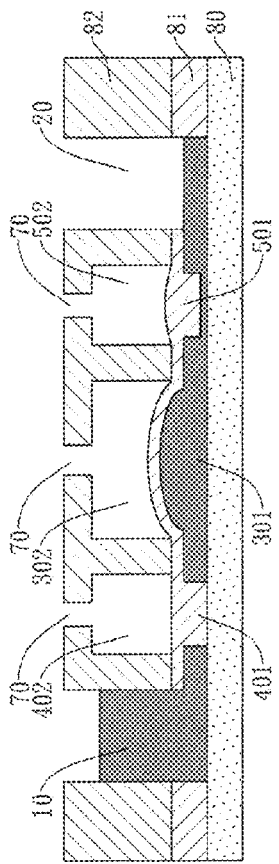
Figure 5D:
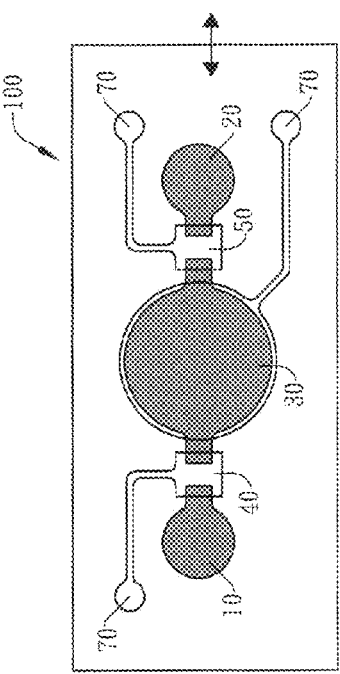
Figure 5E:
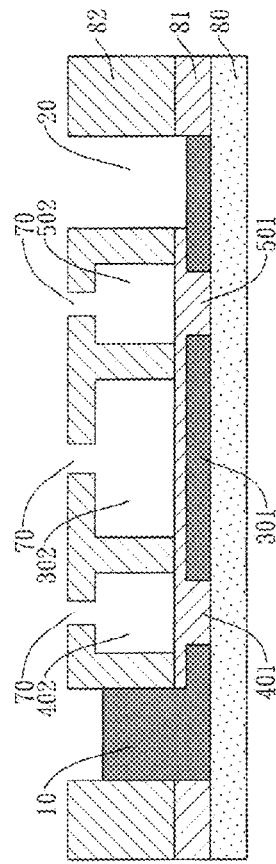
Figure 5E:
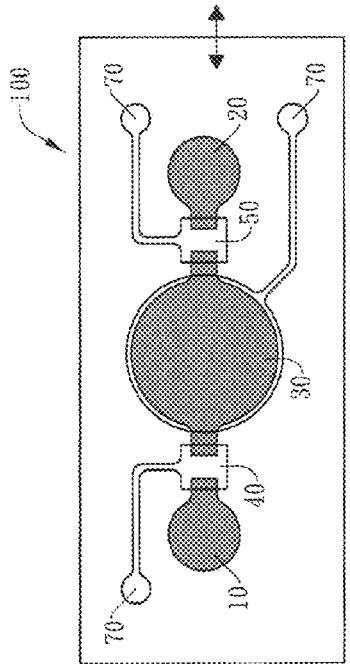

Referring to FIGS. 5(a) through 5(e), the method of using the microfluidic biochip 100 to transport fluids includes the steps of: (a) loading a fluid into the first fluid storage reservoir 10, as shown in FIG. 5(a); (b) forming a negative pressure state inside the fluid transportation reservoir 301 to induce a downward deformation of its top portion, as shown in FIG. 5(b); (c) forming a negative pressure state inside the fluid transportation air chamber 302 to induce an upward deformation of the top portion of the fluid transportation reservoir 301 and concurrently forming a negative pressure state inside the first valve control air chamber 402 to induce an upward deformation of the first valve 401, so that the fluid is forced to flow from the first fluid storage reservoir 10 to the fluid transportation reservoir 301 as shown in FIG. 5(c); (d) releasing the negative pressure inside the first valve control air chamber 402 so that the first valve 401 recovers its original position, and concurrently forming a negative pressure state inside the second valve control air chamber 502 to induce an upward deformation of the second valve 501 so that the fluid is forced to flow from the fluid transportation reservoir 301 to the second fluid storage reservoir 20 as shown in FIG. 5(d); (e)

releasing the negative pressures inside the fluid transportation air chamber 302 and the second valve control air chamber 502, so that the top portion of the fluid transportation reservoir 301 and the second valve 501 recover their original positions as shown in FIG. 5(e); and (f) repeating the steps (c) to (e), so that the fluid is forced to flow from the first fluid storage reservoir 10 to the fluid transportation reservoir 301 and the second fluid storage reservoir 20.

In the step (d) described above, a positive pressure state may further be formed inside the first valve control air chamber 402, so that the force which drives the first valve 401 to move downward becomes stronger. This enables the second first 401 to more firmly block the channel between the fluid transportation reservoir 301 and the first fluid storage reservoir 10, and therefore prevents the fluid to flow from the fluid transportation reservoir 301 back to the first fluid storage reservoir 10.

Figure 6:
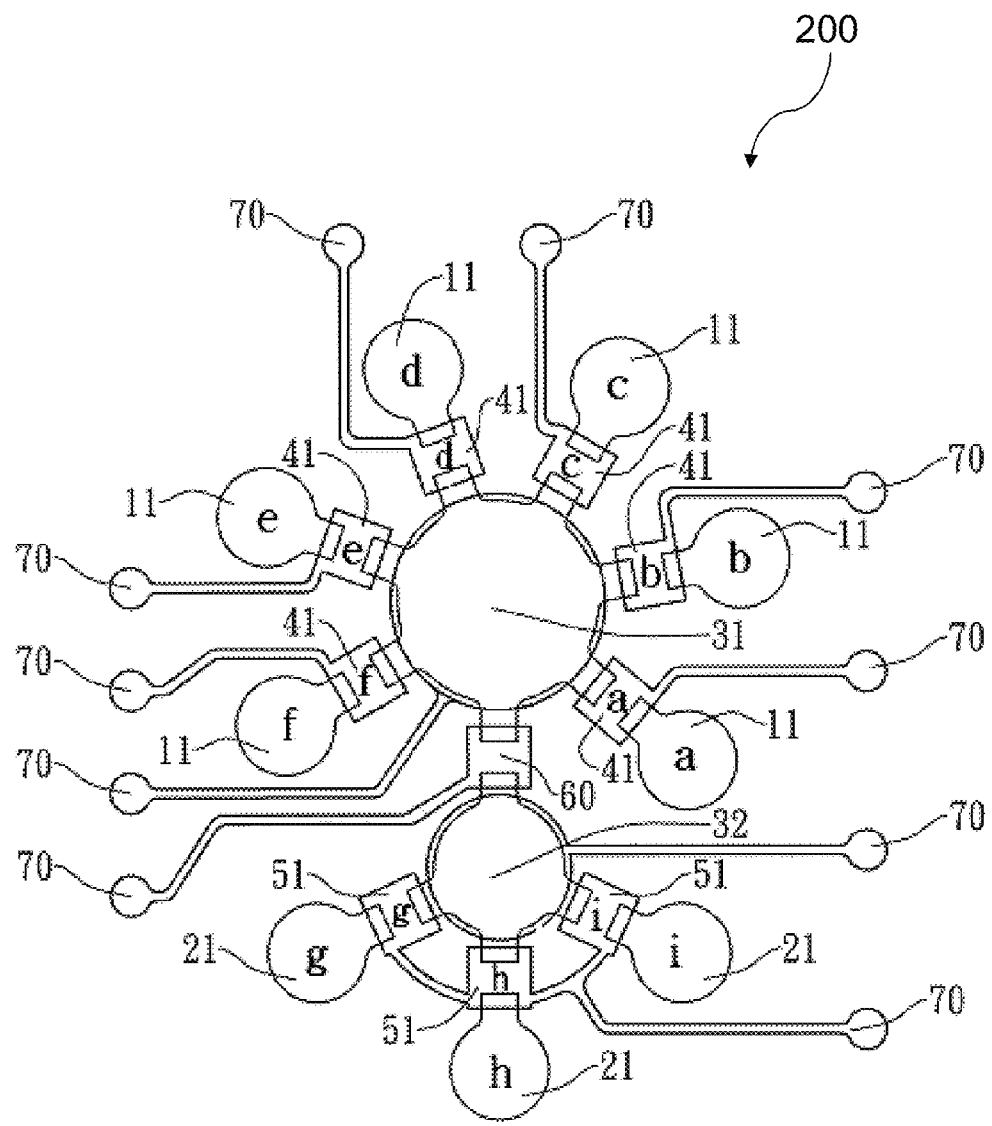
FIG. 6 schematically shows the construction of a PCR biochip of the present invention.

FIG. 6 shows a PCR biochip 200 of the present invention, which comprises: a first fluid transportation unit 31, having a first fluid transportation reservoir and a first fluid transportation air chamber; a second fluid transportation unit 32, having a second fluid transportation reservoir and a second fluid transportation air chamber; a plurality of storage reservoirs 11; a plurality of PCR reservoirs 21; a plurality of storage reservoir valve units 41, each of which having a storage reservoir valve and a storage reservoir valve control air chamber and being located between the first fluid transportation unit 31 and each storage reservoir 11; a plurality of PCR reservoir valve units 51, each of which having a PCR reservoir valve and a PCR reservoir valve control air chamber and being located between the second fluid transportation unit 32 and each PCR reservoir 21; a connection valve unit 60, having a connection valve and a connection valve control air chamber and being located between the first fluid transportation unit 31 and the second fluid transportation unit 32; a magnetic field generating unit (not shown) for generating a magnetic field around the first fluid transportation unit 31; and a temperature control unit to cause temperature variations inside each PCR reservoir 21; wherein each valve, the top portion of the first fluid transportation reservoir and the top portion of the second fluid transportation reservoir are made of a flexible material.

The PCR biochip 200 is a three-layer structure similar to that of the microfluidic biochip 100 illustrated in FIGS. 2 and 3. Moreover, in the PCR biochip 200, the fluid transportation reservoir and the fluid transportation air chamber in each fluid transportation unit, and the valve and the valve control air chamber in each valve unit have the same structure and design as those in the microfluidic biochip 100 described above. These parts are not shown in FIG. 6, and by reference to FIGS. 2 and 3, their corresponding parts with the same structure can be seen.

In a PCR biochip 200, the numbers of the storage reservoir 11, the storage reservoir valve unit 41, the PCR reservoir 21 and the PCR reservoir valve unit 51 may vary depending on the user's needs. In a preferred embodiment as shown in FIG. 6, there are six storage reservoirs 11, six storage reservoir valve units 41, three PCR reservoirs 21 and three PCR reservoir valve units 51; however, the numbers are only exemplary and shall not be construed as limiting the scope of the present invention.

The magnetic field generating unit in the present invention is used for generating a magnetic field around the first fluid transportation unit 31. By turning on/placing and turning off/removing the magnetic field generating unit to generate/stop generating a magnetic field, the first fluid transportation unit 31 can be controlled to cause the magnetic matters inside it to be attracted onto/fall off its inner wall so as to filter out unwanted substances in the fluid. The magnetic field generating unit may be located around the first fluid transportation unit 31; for example, it may be located above the top, at the side or under the bottom of the first fluid transportation unit 31. In a preferred embodiment of the present invention, the magnetic field generating unit is located under the bottom of the first fluid transportation unit 31. The magnetic field generating unit 71 may be any means capable of generating a magnetic field, including, but not limited to, a microcoil array, ferrite magnet, NdFeB magnet or a combination of the above.

The temperature control unit is used to change the temperature inside the PCR reservoir 21 for performing polymerase chain reactions; it includes a heating device and a temperature sensor and may be made of materials including, but not limited to, platinum, aluminum, copper, ceramic or a combination of the above.

In the microfluidic biochip 100 or the PCR biochip 200 of the present invention, the substrate 80 and the air chamber layer 82 are made of a rigid or flexible material including, but not limited to, glass or rigid plastic.

The flexible material described above may be any material capable of changing its shape under pressure, including, but not limited to, poly-diamethylsiloxane (PDMS) or food grade silica gel.

In the microfluidic biochip 100 or the PCR biochip 200 of the present invention, each air chamber may further comprise an air pore 70 as an opening for air to be injected into or extracted from the air chamber, so that the pressure state therein can be changed. When air is injected through an air pore 70 into an air chamber, a positive pressure state will be formed therein; when air is extracted through an air pore 70 from an air chamber, a negative pressure state will be formed therein.

In a microfluidic biochip or a PCR biochip of the present invention, to induce an upward or downward deformation of a valve or the top portion of a fluid transportation reservoir is achieved by forming a positive or negative pressure state inside the corresponding air chamber. When a positive pressure state is formed inside an air chamber, a downward deformation of the corresponding valve or downward deformation of the top portion of the corresponding fluid transportation reservoir will be induced. On the contrary, when a negative pressure state is formed inside an air chamber, an upward deformation of the corresponding valve or upward deformation of the top portion of the corresponding fluid transportation reservoir will be induced.

To be specific, one of the methods of forming a negative pressure state inside the fluid transportation reservoir 301 is to extract air from both the second fluid storage reservoir 20 and the second valve control air chamber 502. Similarly, in the PCR biochip 200, the negative pressure state inside the first fluid transportation reservoir 31 is formed by subsequently extracting air from the second fluid transportation reservoir 32 and the connection valve control air chamber; the negative pressure state inside the second fluid transportation reservoir 32 is formed by subsequently extracting air from the first fluid transportation reservoir 31 and the connection valve control air chamber.

EXAMPLE 1

Using a Microfluidic Biochip of the Invention for Fluid Mixture

Figure 7:
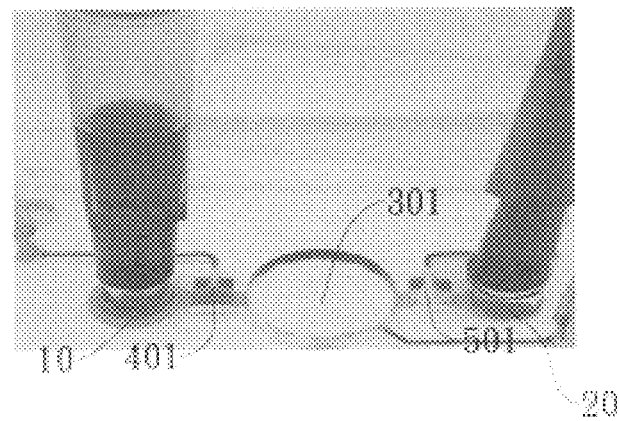
FIGS. 7(a) through 7(c) show a series of photographs for mixing red ink using the microfluidic biochip of the present invention.
Figure 7:
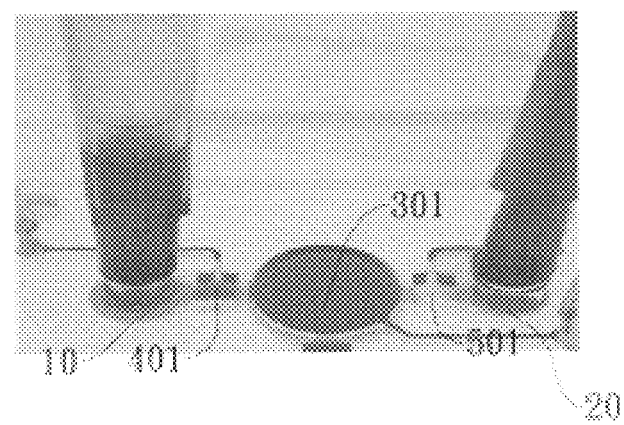
Figure 7:
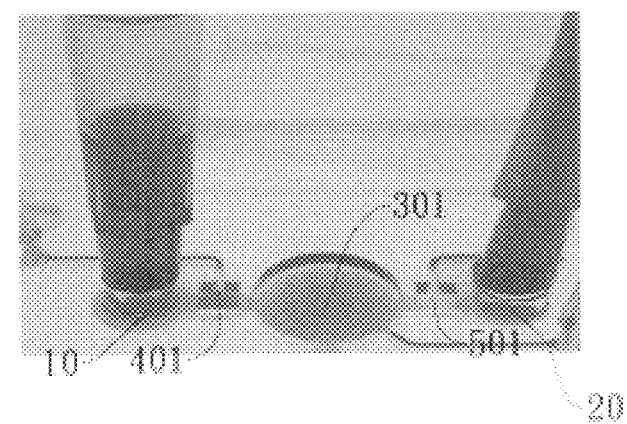

To see the fluid mixing efficiency of a microfluidic biochip of the present invention, 60 μl of red ink is used here for demonstration. The following operation steps are described with reference to FIGS. 4(a) through 4(d); FIGS. 7(a) through 7(c) are a series of photographs taken during the actual mixing process, showing how the red ink moves in the microfluidic biochip. In this example, the method of mixing the red ink is as follows:

(1) Load the red ink into the first fluid storage reservoir 10, as shown in FIG. 4(a). Next, form a negative pressure state inside the fluid transportation reservoir 301 by extracting air from both the second fluid storage reservoir 20 and the second valve control air chamber 502, so that a downward deformation of the top portion of the fluid transportation reservoir 301 is induced, as shown in FIG. 4(b); FIG. 7(a) shows the photograph taken in this step.

(2) Form a negative pressure state inside the first valve control air chamber 402 by extracting air therefrom through the air pore 70, so that an upward deformation of the first valve 401 is induced; concurrently, form a negative pressure state inside the fluid transportation air chamber 302 by extracting air therefrom through the air pore 70, so that an upward deformation of the top portion of the fluid transportation reservoir 301 is induced. In consequence, the red ink is forced to flow from the first fluid storage reservoir 10 to the fluid transportation reservoir 301 as shown in FIG. 4(c); FIG. 7(b) shows the photograph taken in this step.

(3) Stop extracting air from the fluid transportation air chamber 302 and release the negative pressure inside it, so that the top portion of the fluid transportation reservoir 301 recovers its original position. In consequence, the red ink is forced to flow from the fluid transportation reservoir 301 to the first fluid storage reservoir 10 as shown in FIG. 4(d); FIG. 7(c) shows the photograph taken in this step. Then, repeat the steps shown in FIG. 4(c) to FIG. 4(d). In consequence, the red ink is forced to flow back and forth between the first fluid storage reservoir 10 and the fluid transportation reservoir 301 and is properly mixed.

Referring to FIGS. 7(b) and 7(c), it is clear that compared to the red ink within the tube placed above the first fluid storage reservoir 10 in FIG. 7(b), the red ink in FIG. 7(c) reaches a greater tube height. Moreover, compared to the red ink within the fluid transportation reservoir 301 in FIG. 7(b), the red ink in FIG. 7(c) apparently has a smaller volume. This means FIG. 7(b) shows that the red ink has flowed from the first fluid storage reservoir 10 to the fluid transportation reservoir 301, while FIG. 7(c) shows that the red ink has flowed from the fluid transportation reservoir 301 to the first fluid storage reservoir 10. By repeating the steps shown in FIGS. 7(b) and 7(c) consecutively, the red ink flows back and forth between the first fluid storage reservoir 10 and the fluid transportation reservoir 301, and thus, the red ink can be properly mixed.

EXAMPLE 2

Using a Microfluidic Biochip of the Invention for Fluid Transportation

Figure 8:
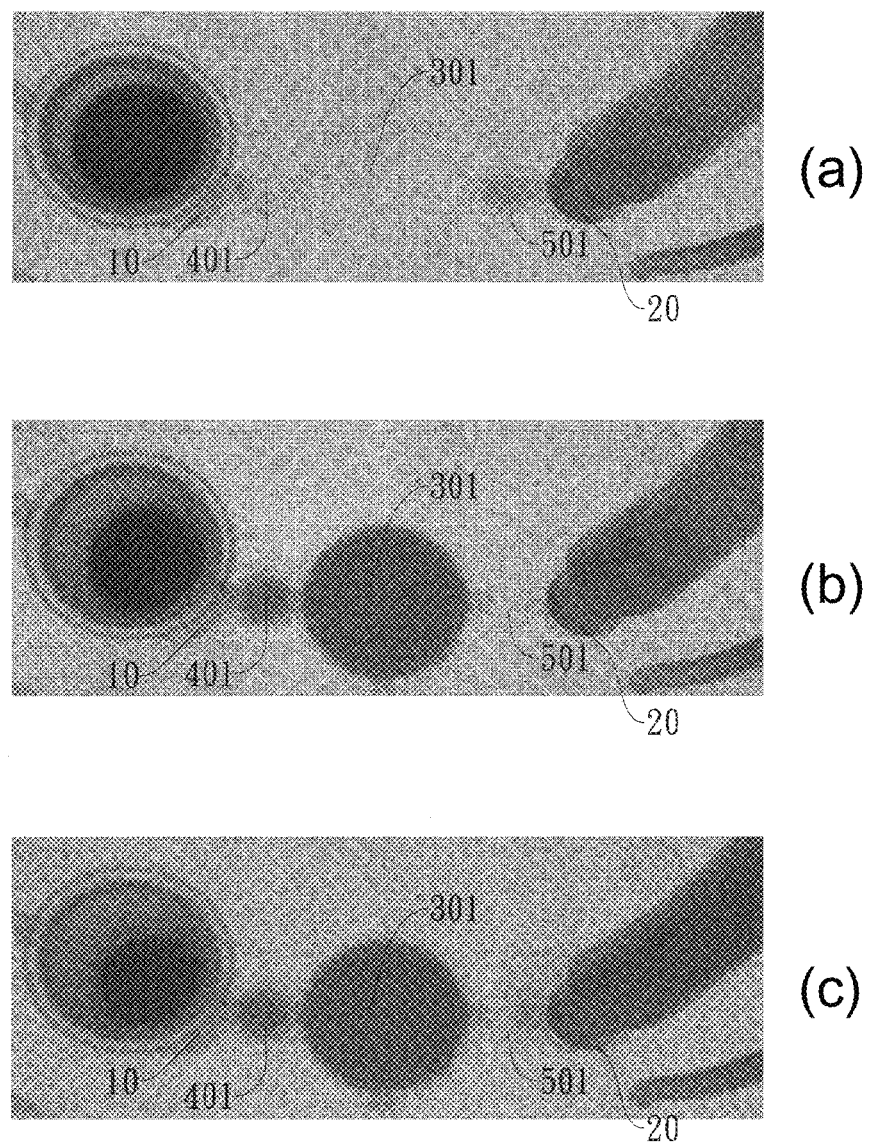
FIGS. 8(a) through 8(c) show a series of photographs for transporting red ink using the microfluidic biochip of the present invention.

To see the fluid transportation efficiency of a microfluidic biochip of the present invention, 60 µl of red ink is used here for demonstration. The following operation steps are described with reference to FIGS. 5(a) through 5(e); FIGS. 8(a) through 8(c) are a series of photographs taken during the actual transportation process, showing how the red ink moves in the microfluidic biochip. In this example, the method of mixing the red ink is as follows:

(1) Load the red ink into the first fluid storage reservoir 10, as shown in FIG. 5(a). Next, form a negative pressure state inside the fluid transportation reservoir 301 by extracting air from both the second fluid storage reservoir 20 and the second valve control air chamber 502, so that a downward deformation of the top portion of the fluid transportation reservoir 301 is induced, as shown in FIG. 5(b); FIG. 8(a) shows the photograph taken in this step.

(2) Form a negative pressure state inside the fluid transportation air chamber 302 by extracting air therefrom through the air pore 70, so that an upward deformation of the top portion of the fluid transportation reservoir 301 is induced; concurrently, form a negative pressure state inside the first valve control air chamber 402 by extracting air therefrom through the air pore 70, so that an upward deformation of the first valve 401 is induced. In consequence, the red ink is forced to flow from the first fluid storage reservoir 10 to the fluid transportation reservoir 301 as shown in FIG. 5(c); FIG. 8(b) shows the photograph taken in this step.

(3) Stop extracting air from the first valve control air chamber 402 and release the negative pressure inside it, so that the first valve 401 recovers its original position; concurrently, form a negative pressure state inside the second valve control air chamber 502, so that an upward deformation of the second valve 501 is induced. In consequence, the red ink is forced to flow from the fluid transportation reservoir 301 to the second fluid storage reservoir 20 as shown in FIG. 5(d). Next, stop extracting air from the fluid transportation air chamber 302 and the second valve control air chamber 502 and release the negative pressures inside them, so that the top portion of the fluid transportation reservoir 301 and the second valve 501 recover their original positions as shown in FIG. 5(e). Then, repeat the steps shown in FIG. 5(d) and FIG. 5(e). In consequence, the red ink is forced to flow from the first fluid storage reservoir 10 to the fluid transportation reservoir 301 and the second fluid storage reservoir 20; FIG. 8(c) shows the photograph taken in this step.

Referring to FIGS. 8(b) and 8(c), it is clear that compared to the red ink within the tube placed above the first fluid storage reservoir 10 in FIG. 8(b), the red ink in FIG. 8(c) is at a lower tube height. This means FIG. 8(c) shows that the red ink has flowed from the first fluid storage reservoir 10 to the second fluid storage reservoir 20.

EXAMPLE 3

Using a PCR Biochip of the Invention to Perform a PCR Process

In this example, a PCR biochip of the present invention is utilized to extract the DNA from human saliva and then perform a PCR process. Afterwards, 2-D electrophoresis tests are carried out to observe the amplification results of the PCR products.

Materials:

Sample: a human saliva sample was collected for testing.

Magnetic beads: magnetic beads (Dynabeads® DNA-DIRECT™-Universal, Invitrogen Corporation, USA) with silica coating on the surface were used. The beads have specificity for binding to DNA in a high concentration buffered saline.

Washing buffer: 100 mM of Tris-HCl (pH 7.5, Invitrogen Corporation, USA) was diluted to 10× dilution Elution buffer: 1× phosphate buffered saline (Invitrogen Corporation, USA) was used.

PCR reagent: 2 µl of S1/S2 primers, 2.5 µl of 10× reaction buffer (Promega, USA), 1 µl of 0.2 mM deoxynucleotide triphosphate (dNTP, Promega, USA) and 0.5 µl of 1.5 units of DNA polymerase (Promega, USA) were used.

1. Method of Using the PCR Biochip to Amplify DNA

In this example, a PCR biochip of the present invention is used to perform a PCR process, and the following operation steps are described by reference to FIG. 6. Moreover, the method of using the PCR biochip to mix fluids is the same as that described in Example 1, and the method to transport fluids is the same as that described in Example 2; detailed operation steps can be found in the relevant descriptions.

As it is described previously, the PCR biochip 200 in FIG. 6 is actually a three-layer structure. In the PCR biochip 200, the first fluid transportation unit 31 comprises a first fluid transportation reservoir and a first fluid transportation air chamber. Because the first fluid transportation reservoir is located at the lower part of the first fluid transportation unit and is not shown in FIG. 6, for the purpose of making a clear explanation, reference numeral 31 of the first fluid transportation unit will be used to denote the first fluid transportation reservoir in the following description in this example. Similarly, reference numeral 32 of the second fluid transportation unit denotes the second fluid transportation reservoir; reference numeral 60 of the connection valve unit denotes the connection valve; reference numeral 41 of the storage reservoir valve unit denotes the storage reservoir valve; and reference numeral 51 of the PCR reservoir valve unit denotes the PCR reservoir valve. The steps of using the PCR biochip 200 for amplifying DNA are as follows:

(1) Respectively load the magnetic beads into the storage reservoir 11a, the nucleic acid extraction reagent into the storage reservoir 11b, and the saliva sample into the storage reservoir 11c. Load the PCR reagent into the PCR reservoirs 21g, 21h and 21i.

(2) Form a negative pressure state in the respective storage reservoir 11f, the storage reservoir valve control air chamber f and the connection valve control air chamber. Consequently, upward deformations of the storage reservoir valve f and the connection valve 60 are induced, thereby inducing downward deformations of the top portion of the first fluid transportation reservoir 31 and the top portion of the second fluid transportation reservoir 32 (as described in step (1) of Example 2).

(3) Successively transport the magnetic beads in the storage reservoir 11a, the extraction reagent in the storage reservoir 11b and the saliva sample in the storage reservoir 11c to the first fluid transportation reservoir 31 (as described in step (2) of Example 2), and make all the substances flow back and forth between the storage reservoir 11c and the first fluid transportation reservoir 31 (as described in step (3) of Example 1). By doing so, the substances are well mixed. This mixing step helps to break the leukocytes in the saliva sample and further break the nucleus in the leukocytes, so that DNAs are obtained; then, the DNAs bind to the silica coating on the surface of the magnetic beads. Next, place a magnet under the bottom of the first fluid transportation reservoir 31, so that the magnetic beads are attracted onto the reservoir inner wall near the bottom of the first fluid transportation reservoir 31. Then, transport the waste fluids of the extraction reagent and the sample in the first fluid transportation reservoir 31 and storage reservoir 11c to the storage reservoir 11f, which is used as a waste fluid storage reservoir (transportation method as described in step (3) of Example 2). Next, remove the magnet.

(4) Load a washing buffer into the storage reservoir 11d, and then transport the washing buffer to the first fluid transportation reservoir 31 (as described in step (3) of Example 2). Next, make the fluid to flow back and forth between the storage reservoir 11b and the first fluid transportation reservoir 31 to be well mixed (as described in step (3) of Example 1). Then, place a magnet under the bottom of the first fluid transportation reservoir 31. After that, transport the fluid in the first fluid transportation reservoir 31 and the storage reservoir 11b to the storage reservoir 11f (as described in step (3) of Example 2). Then, remove the magnet.

(5) Load an elution buffer into the storage reservoir 11e, and then transport the elution buffer to the first fluid transportation reservoir 31 (as described in step (3) of Example 2). Next, make the fluid to flow back and forth between the storage reservoir 11e and the first fluid transportation reservoir 31 to be well mixed (as described in step (3) of Example 1). In addition to mixing the fluid, this step helps to break the bond between the DNA and the silica coating on the surface of the magnetic bead, so that the DNA is released.

(6) Again, place a magnet under the bottom of the first fluid transportation reservoir 31 in order to attract the magnetic beads onto the reservoir inner wall near the bottom of the first fluid transportation reservoir 31. Next, form a negative pressure state inside the connection valve control air chamber to induce an upward deformation of the connection valve 60, and form a negative pressure state inside the second fluid transportation air chamber to induce an upward deformation of the top portion of the second fluid transportation reservoir 32. In consequence, the fluid (containing the DNAs) in the first fluid transportation reservoir 31 is forced to be transported to the second fluid transportation reservoir 32 (as described in step (3) of Example 2). Next, release the negative pressure inside the connection valve control air chamber, so that the connection valve 60 recovers its original position and blocks the channel between the first fluid transportation reservoir 31 and the second fluid transportation reservoir 32. Then, remove the magnet.

(7) Form a negative pressure state in each PCR valve control air chamber, so that upward deformations of the PCR valves 51g, 51h and 51i are induced; concurrently release the negative pressure inside the second fluid transportation air chamber, so that the top portion of the second fluid transportation reservoir 32 recovers its original position. In consequence, the fluid (containing the DNA) in the second fluid transportation reservoir 32 is forced to be transported to the PCR reservoirs 21g, 21h and 21i. Then, release the negative pressure in each PCR valve control air chamber, so that the PCR valves 51g, 51h and 51i recover their original positions. Thus, the channels between the second fluid transportation reservoir 32 and each of the PCR reservoirs 21g, 21h and 21i are blocked.

(8) Operate the temperature control unit to perform a PCR process in each PCR reservoir 21g, 21h and 21i for DNA amplification. Then, collect the PCR products from those PCR reservoirs.

2. Determining the Concentrations of the PCR Products

After collecting the PCR products, the DNA concentrations were determined using a spectrophotometer, and absorbance of the product sample was read at 260 nm and 280 nm. $A_{260}/A_{280}$ represents the ratio of the absorbance readings at 260 nm and 280 nm; an $A_{260}/A_{280}$ value closer to 2 means a higher DNA purity in the sample. The result is shown in the following table:

|   | Concentration ng/µ l | A260/A280 |
|---|---|---|
| A | 85.18 | 1.87 |
| B | 88.86 | 1.86 |
| C | 88.95 | 1.89 |

The above table shows the $A_{260}/A_{280}$ values of the PCR products in the PCR reservoirs 21g, 21h and 21i, and all the values are close to 2. It is clear that the DNAs extracted and amplified by the PCR biochip of the present invention are of a high purity. Generally, the $A_{260}/A_{280}$ value of amplified DNA obtained from a commercially available PCR machine is about 1.8 to 1.9. Thus, the present invention provides a PCR biochip which allows the sample extraction and the PCR process to be completed within a single biochip, and purities of its PCR products are close to those obtained from a commercially available PCR machine. Most importantly, it takes about 40 minutes to finish a PCR process when a PCR biochip of the present invention is used, while a PCR process using a conventional PCR machine takes about 2.5 hours. That is, only a quarter of the operation time is needed if a PCR biochip of the present invention is used.

3. Using 2-D Electrophoresis to Analyze the PCR Products

Figure 9:
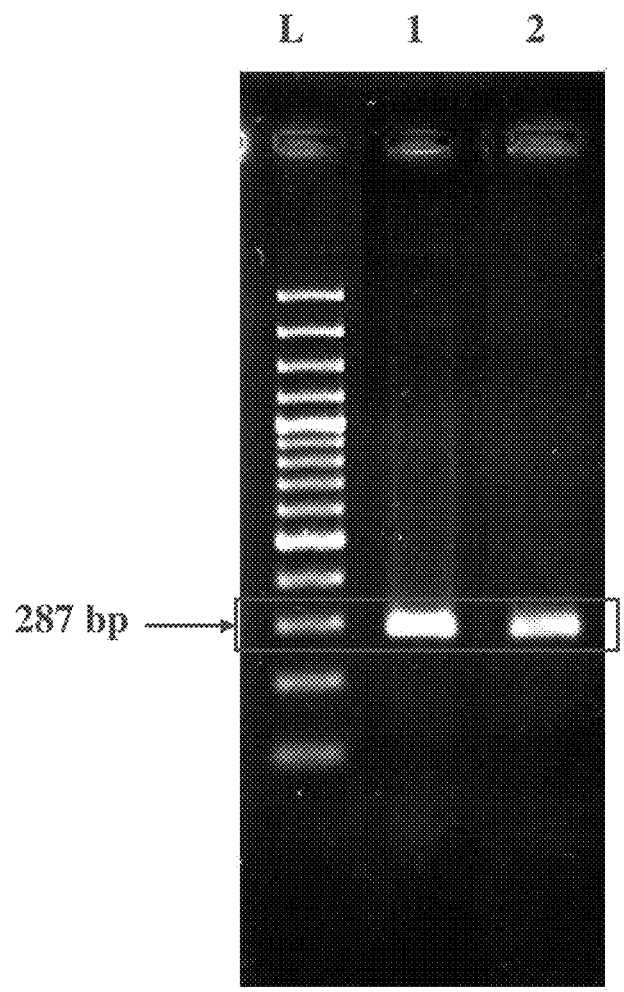
FIG. 9 shows a 2-D electrophoresis image of the PCR products obtained from the PCR biochip of the present invention.

PCR products A and C are analyzed using 2-D gel electrophoresis, and the result is shown in FIG. 9, where L includes markers of DNA fragments in various lengths, 1 represents the gel electrophoresis result of product A, and 2 represents the gel electrophoresis result of product C. As shown in FIG. 9, there shows a 287 bp band of mitochondrial DNA (mtDNA) in both product A and product C respectively. This means that after the extraction and amplification operations using the PCR biochip of the present invention, the PCR products collected from the different PCR reservoirs demonstrated the same electrophoresis results. Therefore, a PCR biochip of the present invention is useful for applications concerning nucleic acid extraction and amplification in the biomedical industry.

In sum, a microfluidic biochip of the present invention can be employed to mix or transport fluids by changing the pressure state inside the components. Moreover, the biochip of the present invention is small in size and only consumes a small amount of a sample to achieve the fluid transportation or mixing effect. In addition, it only takes a short time to complete the nucleic acid extraction and amplification operations using a single PCR biochip of the present invention, and thus, the possibility of sample denaturation is reduced. Therefore, the biochip design of the present invention can be widely used for applications in the biomedical or chemical fields.

Other Embodiments

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

The preferred embodiments of the present invention have been disclosed in the examples. However the examples should not be construed as a limitation on the actual applicable scope of the invention, and as such, all modifications and alterations without departing from the spirits of the invention and appended claims, including the other embodiments shall remain within the protected scope and claims of the invention.

What is claimed is:

1. A PCR (polymerase chain reaction) biochip, which comprises:
a first fluid transportation unit, having a first fluid transportation reservoir and a first fluid transportation air chamber;
a second fluid transportation unit, having a second fluid transportation reservoir and a second fluid transportation air chamber;
a plurality of storage reservoirs;
a plurality of PCR (polymerase chain reaction) reservoirs;
a plurality of storage reservoir valve units, each of which having a storage reservoir valve and a storage reservoir valve control air chamber and being located between the first fluid transportation unit and each storage reservoir;
a plurality of PCR reservoir valve units, each of which having a PCR reservoir valve and a PCR reservoir valve control air chamber and being located between the second fluid transportation unit and each PCR reservoir;
a connection valve unit, having a connection valve and a connection valve control air chamber and being located between the first fluid transportation unit and the second fluid transportation unit;
a magnetic field generating unit for generating a magnetic field around the first fluid transportation unit; and
a temperature control unit to cause temperature variations inside each PCR reservoir;
wherein each valve, the top portion of the first fluid transportation reservoir and the top portion of the second fluid transportation reservoir are made of a flexible material, and each said air chamber is open and further connects an air pore as an opening for air injection or extraction;
whereby the each valve, the top portion of the first fluid transportation reservoir and the top portion of the second fluid transportation reservoir are deformed when a positive or negative pressure state inside each said air chamber is selectively formed by air injection or extraction.

2. The biochip of claim 1, which is a three-layer structure comprising:
a substrate;
a fluidic channel layer located above the substrate; and
an air chamber layer located above the fluidic channel layer;
wherein the fluidic channel layer is made of a flexible material.

3. The biochip of claim 2, wherein the first fluid transportation reservoir and the second fluid transportation reservoir are formed by the combination of the substrate and the fluidic channel layer.

4. The biochip of claim 2, wherein the first fluid transportation air chamber and the second fluid transportation air chamber are formed by the combination of the fluidic channel layer and the air chamber layer.

5. The biochip of claim 2, wherein the plurality of storage reservoirs and the plurality of PCR reservoirs are formed by the combination of the substrate, the fluidic channel layer and the air chamber layer.

6. The biochip of claim 2, wherein the plurality of storage reservoir valves, the plurality of PCR reservoir valves and the connection valve are located in the fluidic channel layer.

7. The biochip of claim 2, wherein the plurality of storage reservoir valve control air chambers, the plurality of PCR reservoir valve control air chambers and the connection valve control air chamber are formed by the combination of the fluidic channel layer and the air chamber layer.

8. The biochip of claim 1, wherein the magnetic field generating unit is located below the bottom of the first fluid transportation unit.

9. The biochip of claim 1, wherein the temperature control unit includes a heating device and a temperature sensor.

10. A method of using the PCR biochip of claim 1 for amplifying nucleic acids, comprising the steps of:
respectively loading a nucleic acid extraction reagent, a sample and magnetic beads into different storage reservoirs, and loading a PCR reagent into each PCR reservoir;
selectively forming a positive or negative pressure state inside the respective first fluid transportation reservoir, the plurality of first fluid transportation air chambers and the plurality of storage reservoir valve control air chambers to induce the deformations of the top portion of the first fluid transportation reservoir and the plurality of storage reservoir valves, so that the nucleic acid extraction reagent, the sample and the magnetic beads are transported between each storage reservoir and the first fluid transportation reservoir;

operating the magnetic field generating unit to obtain nucleic acids from the sample inside the first fluid transportation reservoir;

forming a positive or negative pressure state inside the connection valve control air chamber to induce deformation of the connection valve so as to transport the nucleic acids from the first fluid transportation reservoir to the second fluid transportation reservoir;

forming a positive or negative pressure state inside the respective second fluid transportation reservoir, the second fluid transportation air chamber and the plurality of PCR reservoir valve control air chambers to induce deformations of the top portion of the second fluid transportation reservoir and the plurality of PCR valves, so that the nucleic acids are transported from the second fluid transportation reservoir into each PCR reservoirs;

operating the temperature control unit to perform an amplification process of the nucleic acids inside each PCR reservoir; and collecting the amplified products from each PCR reservoir.

11. The method of claim 10, wherein the negative pressure state inside the first fluid transportation reservoir is formed by subsequently extracting air from the second fluid transportation reservoir and the connection valve control air chamber, and the negative pressure state inside the second fluid transportation reservoir is formed by subsequently extracting air from the first fluid transportation reservoir and the connection valve control air chamber.

12. The method of claim 10, wherein the positive pressure state inside each air chamber formed by injecting air thereinto.

13. The method of claim 10, wherein the negative pressure state inside each air chamber is formed by extracting air therefrom.

* * * * *